US011451486B2

(12) United States Patent
Amend et al.

(10) Patent No.: US 11,451,486 B2
(45) Date of Patent: Sep. 20, 2022

(54) TECHNIQUES FOR SCHEDULING MULTIPATH DATA TRAFFIC

(71) Applicant: Deutsche Telekom AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/981,347

(22) PCT Filed: Feb. 21, 2019

(86) PCT No.: PCT/EP2019/054267
§ 371 (c)(1),
(2) Date: Sep. 16, 2020

(87) PCT Pub. No.: WO2019/179715
PCT Pub. Date: Sep. 26, 2019

(65) Prior Publication Data
US 2021/0014171 A1    Jan. 14, 2021

(30) Foreign Application Priority Data

Mar. 19, 2018 (EP) ..................... 18162493

(51) Int. Cl.
*H04L 47/56* (2022.01)
*H04L 45/24* (2022.01)
*H04L 47/125* (2022.01)
*H04L 47/24* (2022.01)
*H04L 47/32* (2022.01)

(52) U.S. Cl.
CPC .............. *H04L 47/56* (2013.01); *H04L 45/24* (2013.01); *H04L 47/125* (2013.01); *H04L 47/24* (2013.01); *H04L 47/32* (2013.01)

(58) Field of Classification Search
None
See application file for complete search history.

(56) References Cited

U.S. PATENT DOCUMENTS

| 2005/0025090 | A1* | 2/2005 | Klein | H04L 47/14 370/328 |
| 2014/0219090 | A1* | 8/2014 | Ramanathan | H04L 49/505 370/235 |
| 2015/0172198 | A1* | 6/2015 | Levy | H04L 47/11 370/232 |
| 2015/0281100 | A1* | 10/2015 | Kurita | H04L 47/263 370/230 |
| 2016/0174280 | A1* | 6/2016 | Singh | H04W 76/15 370/329 |
| 2017/0295104 | A1* | 10/2017 | Hampel | H04L 47/24 |

(Continued)

FOREIGN PATENT DOCUMENTS

WO    WO 2017220149 A1    12/2017

*Primary Examiner* — Mariela Vidal Carpio
(74) *Attorney, Agent, or Firm* — Leydig, Voit & Mayer, Ltd.

(57) ABSTRACT

A multipath scheduler device for scheduling data traffic includes: at least one first type data path; at least one second type data path; and a scheduler configured to schedule a first portion of the data traffic for transmission via the at least one first type data path and to schedule a second portion of the data traffic for delayed transmission via the at least one second type data path.

13 Claims, 9 Drawing Sheets

(56) References Cited

U.S. PATENT DOCUMENTS

| | | | |
|---|---|---|---|
| 2019/0141573 A1* | 5/2019 | Bostrom | H04W 4/40 |
| 2019/0207859 A1* | 7/2019 | Schmidtke | H04L 45/24 |
| 2019/0215107 A1* | 7/2019 | Lida | H04L 1/1628 |
| 2020/0136977 A1* | 4/2020 | Chen | H04L 47/125 |
| 2020/0252839 A1* | 8/2020 | Tang | H04W 36/00 |
| 2020/0403923 A1* | 12/2020 | Attar | H04L 47/125 |

\* cited by examiner

TECHNIQUES FOR SCHEDULING MULTIPATH DATA TRAFFIC

CROSS-REFERENCE TO PRIOR APPLICATIONS

This application is a U.S. National Phase Application under 35 U.S.C. § 371 of International Application No. PCT/EP2019/054267, filed on Feb. 21, 2019, and claims benefit to European Patent Application No. EP 18162493.3, filed on Mar. 19, 2018. The International Application was published in English on Sep. 26, 2019 as WO 2019/179715 A1 under PCT Article 21(2).

TECHNICAL FIELD

The disclosure relates to techniques for scheduling data traffic for transmission over multiple paths from which at least one path is of a first type, in particular a cheap data path, and at least another path is of a second type, in particular an expensive data path. The disclosure further relates to a multipath scheduler and a method for scheduling multipath data traffic. In particular, the disclosure relates to detecting and equalizing bursty traffic to offload determined paths in multipath scenarios.

BACKGROUND

Several multipath protocols like Multipath Transport Control Protocol (MPTCP) according to "A. Ford and C. Raiciu and M. Handley and O. Bonaventure, "TCP Extensions for Multipath Operation with Multiple Addresses", RFC no. 6824, January 2013", Multipath Quick User Datagram Protocol Internet Connections (QUIC) according to "Ryan Hamilton and Jana Iyengar and Ian Swett and Alyssa Wilk, "QUIC: A UDP-Based Secure and Reliable Transport for HTTP/2", draft-tsvwg-quic-protocol-02, January 2016", Huawei's Generic Routing Encapsulation (GRE) Tunnel Bonding Protocol according to "N. Leymann and C. Heidemann and M. Zhang and B. Sarikaya and M. Cullen, "Huawei's GRE Tunnel Bonding Protocol", RFC no. 8157, May 2017" and many others offer capacity aggregation over several paths. These paths may have different costs, e.g. cheap and expensive or expressed in other terms. For example the cheap path may be a WiFi path and the expensive path may be an LTE (Long Term Evolution) path. Cost does not inevitably mean a direct payment, it can also be defined in terms of latency, reliability and many others.

An often used service over the internet is non-real-time video streaming which is typically of bursty nature. A video source tries to fill a buffer at the sink as fast as possible and stops if the buffer is full. As soon as the buffer is empty by some level, the source tries again to fill the sink buffer. In a multipath scenario, where additional capacity is provided, the video source will use all available data paths to fill the sink buffer as fast as possible and hence may combine the capacity of a cheaper path with the capacity of an expensive path. This behavior may be undesired for the customer, especially if the cheaper path is sufficient to satisfy the demand without significantly influencing the QoE (Quality of Experience).

SUMMARY

In an exemplary embodiment, the present invention provides a multipath scheduler device for scheduling data traffic. The multipath scheduler device includes: at least one first type data path; at least one second type data path; and a scheduler configured to schedule a first portion of the data traffic for transmission via the at least one first type data path and to schedule a second portion of the data traffic for delayed transmission via the at least one second type data path.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
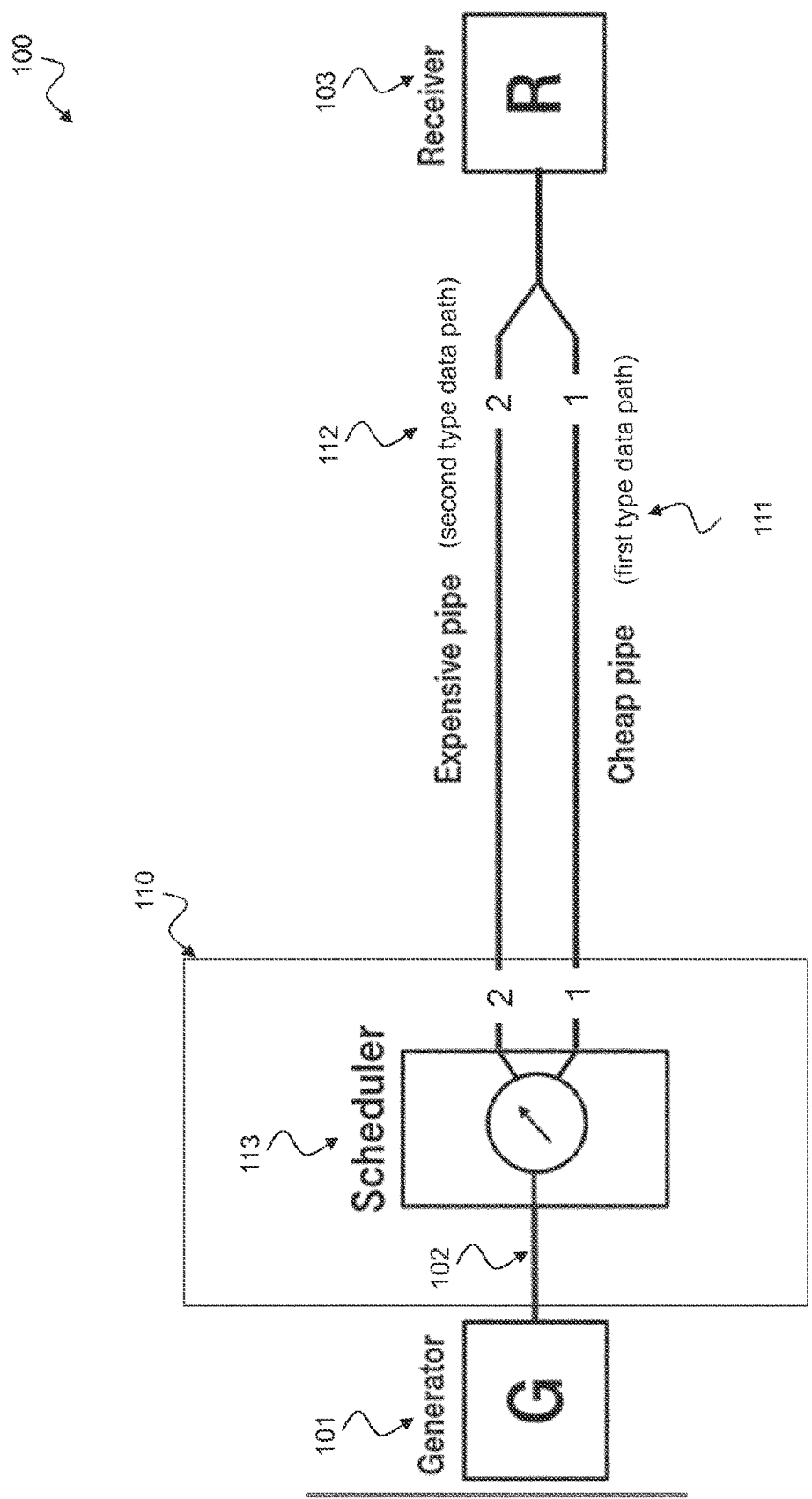
FIG. 1 shows an exemplary multipath communication system 100 with two paths of different type, in particular of different cost according to the disclosure.

Exemplary embodiments of the present invention provide for efficiently scheduling data traffic, in particular bursty data traffic, in multipath scenarios where cheap and expensive paths are available.

Exemplary embodiments of this disclosure delay the overflowing traffic of a cheaper path, e.g. the peak traffic not fitting into the cheaper path, in order to fill it into the cheaper path at a later time, e.g. into the gaps between the bursts of the bursty data traffic, and hence avoid or at least limit using an expensive data path.

The methods and systems presented below may be of various types. The individual elements described may be realized by hardware or software components, for example electronic components that can be manufactured by various technologies and include, for example, semiconductor chips, application-specific integrated circuits (ASICs), microprocessors, digital signal processors, integrated electrical circuits, electro-optical circuits and/or passive components.

The devices, systems and methods presented below are capable of transmitting information over a communication network. The term communication network refers to the technical infrastructure on which the transmission of signals takes place. The communication network comprises the switching network in which the transmission and switching of the signals takes place between the stationary devices and platforms of the mobile radio network or fixed network, and the access network in which the transmission of the signals takes place between a network access device and the communication terminal. The communication network can comprise both components of a mobile radio network as well as components of a fixed network. In the mobile network, the access network is also referred to as an air interface and includes, for example, a base station (NodeB, eNodeB, radio cell) with mobile antenna to establish the communication to a communication terminal as described above, for example, a mobile phone or a mobile device with mobile adapter or a machine terminal. In the fixed network, the access network includes, for example, a DSLAM (digital subscriber line access multiplexer) to connect the communication terminals of multiple participants based on wires. Via the switching network the communication can be transferred to other networks, for example other network operators, e.g. foreign networks.

In communications and computing systems, the Open Systems Interconnection model (OSI model) defines a conceptual model that characterizes and standardizes the communication functions without regard to its underlying internal structure and technology. Its goal is the interoperability of diverse communication systems with standard protocols. The model partitions a communication system into abstraction layers. The original version of the model defined seven layers: Physical layer (Layer 1), Data Link layer (Layer 2), Network layer (Layer 3), Transport layer (Layer 4), Session layer (Layer 5), Presentation layer (Layer 6) and Application layer (Layer 7).

According to a first aspect the invention relates to a multipath scheduler device for scheduling data traffic for transmission via at least one first type data path and at least one second type data path, the multipath scheduler device comprising: at least one first type data path; at least one second type data path; and a scheduler configured to schedule the data traffic for transmission via the at least one first type data path and to schedule the data traffic for delayed transmission via the at least one second type data path. In an exemplary implementation form of the multipath scheduler device, a switch is arranged between the at least one first type data path and the at least one second type data path. In an exemplary implementation form of the multipath scheduler device, the switch between the at least one first type data path and the at least one second type data path is based on a capacity threshold of the at least one first type data path and/or based on a traffic distribution function for distributing traffic between the at least one first type data path and the at least one second type data path. This exemplary implementation should not be understood as limiting, but rather as a descriptive example. Any kind of distributing function can be combined with delaying transmission via the at least one second type data path.

Such a multipath scheduler device can efficiently schedule data traffic, in particular bursty data traffic, in multipath scenarios where cheap and expensive paths are available. The overflowing traffic of a cheaper path, e.g. the peak traffic not fitting into the cheaper path, can be delayed in order to fill it into the cheaper path at a later time, e.g. into the gaps between the bursts of the bursty data traffic.

In an exemplary implementation form of the multipath scheduler device, data traffic transmission via the at least one second type data path is more expensive than data traffic transmission via the at least one first type data path, in particular more expensive with respect to latency, reliability, capacity, complexity and/or cost.

This provides the advantage that data traffic can be flexible transmitted via different data paths which have different costs, for example via a cheap WiFi data path and an expensive LTE data path. Cost does not inevitably mean a direct payment, it can also be defined in terms of latency, reliability and many others.

In an exemplary implementation form of the multipath scheduler device, the scheduler is configured to schedule the data traffic for delayed transmission via the second type data path if a bursty traffic pattern of the data traffic is detected.

This provides the advantage that when delaying the transmission in bursty traffic situations the peak traffic that will use the second type data path, i.e. the expensive data path, may fall in the gap between two peaks of bursty data traffic and hence can be transmitted by the first type data path, i.e. the cheap data path. I.e., transmission cost can be reduced.

In an exemplary implementation form of the multipath scheduler device, the scheduler is configured to detect a bursty traffic pattern based on a peak behavior of data traffic scheduled for transmission via the at least one second type data path.

This provides the advantage that bursty data traffic can be easily detected by checking the second type data path.

In an exemplary implementation form of the multipath scheduler device, the scheduler is configured to delay access to the at least one second type data path based on a trigger.

This provides the advantage that the trigger can guarantee same conditions for the scheduling. The trigger can be predetermined or can be adjusted depending on the traffic situation. Hence, the multipath scheduler device can be applied in different kinds of traffic situation.

In an exemplary implementation form of the multipath scheduler device, the trigger is based on a traffic parameter or a combination of traffic parameters.

This provides the advantage that the traffic parameter can be selected according to the respective traffic situation allowing to adjust the trigger in order to optimally distribute the data traffic between cheap and expensive data paths.

In an exemplary implementation form of the multipath scheduler device, the trigger is based on a last path usage, $T_{LPU}$ and a corresponding path access delay, $T_{Delay}$.

This provides the advantage that the delay for bursty data traffic can be suitably selected in order to provide adequate usage of the cheap and expensive data paths.

In an exemplary implementation form of the multipath scheduler device, the scheduler is configured to delay access to the at least one second type data path if the last path usage, $T_{LPU}$ is higher than a threshold.

This provides the advantage that bursty traffic can be reliably detected and the scheduling can be optimally adjusted.

In an exemplary implementation form of the multipath scheduler device, the scheduler is configured to deny access to the at least one second type data path for a time corresponding to the path access delay, $T_{Delay}$.

This provides the advantage that a minimum delay can be adjusted during which the second type data path, i.e. the expensive data path is not used.

In an exemplary implementation form of the multipath scheduler device, the trigger is based on a data volume, a data volume in a predefined time period or a combination thereof.

This provides the advantage that the trigger can be optimally selected based on the traffic conditions.

In an exemplary implementation form of the multipath scheduler device, the trigger is based on information about gaps on traffic transmission of the at least one first type data path.

This provides the advantage that the trigger can be optimally selected based on information or knowledge about gaps in the traffic transmission on the first type data path, e.g. the cheaper data path.

In an exemplary implementation form of the multipath scheduler device, the trigger is based on heuristic methods.

This provides the advantage that the trigger can be optimally selected based on applying such heuristics.

In an exemplary implementation form of the multipath scheduler device, the scheduler is configured to delay access to the at least one second type data path based on an access limitation function.

This provides the advantage that the access limitation function provides less strict access to the second type data path than the delay function. Hence, a smoother access to the second type data path can be realized.

In an exemplary implementation form of the multipath scheduler device, the access limitation function comprises a slope function, in particular an exponential function, a ramp function or a step function.

This provides the advantage that various designs can be implemented to realize the access limitation function. Depending on the traffic situation an adequate access limitation function can be selected, thereby providing a high degree of flexibility.

In an exemplary implementation form of the multipath scheduler device, the scheduler is configured to buffer the data traffic overflowing the capacity threshold and to schedule the buffered data traffic for transmission via the at least one first type data path.

This provides the advantage that the overflowing data traffic can be buffered in a buffer and can be transmitted at a later time when the first type data path is empty. Hence, costs for transmission can be reduced by avoiding usage of the expensive data path.

In an exemplary implementation form of the multipath scheduler device, the at least one first type data path comprises a send buffer configured to buffer the overflowing data traffic, wherein a size of the send buffer is adjustable based on the overflowing data traffic.

This provides the advantage that by using such a buffer, depending on the buffer size, an access to the second type data path can be avoided or at least limited and thus costs for data transmission can be reduced.

According to a second aspect, the invention relates to a method for scheduling multipath data traffic for transmission via at least one first type data path and at least one second type data path, the method comprising: scheduling the data traffic for transmission via the at least one first type data path and scheduling the data traffic for delayed transmission via the at least one second type data path. In an exemplary implementation form of the method, the method further comprises switching between the at least one first type data path and the at least one second type data path. In an exemplary implementation form of the method, the switching between the at least one first type data path and the at least one second type data path is based on a capacity threshold of the at least one first type data path and/or based on a traffic distribution function. This exemplary implementation should not be understood as limiting, but rather as a descriptive example. Any kind of distributing function can be combined with delaying transmission via the at least one second type data path.

Such a method can efficiently schedule data traffic, in particular bursty data traffic, in multipath scenarios where cheap and expensive paths are available. The overflowing traffic of a cheaper path, e.g. the peak traffic not fitting into the cheaper path, can be delayed in order to fill it into the cheaper path at a later time, e.g. into the gaps between the bursts of the bursty data traffic.

According to a third aspect, the invention relates to a computer readable non-transitory medium on which computer instructions are stored which, when executed by a computer, cause the computer to perform the method according to the second aspect of the invention.

According to a fourth aspect the invention relates to a computer program product comprising program code for performing the method according to the second aspect of the invention, when executed on a computer or a processor.

Embodiments of the invention can be implemented in hardware and/or software.

The following acronyms are applied in this disclosure:

| | |
|---|---|
| GRE | Generic Routing Encapsulation |
| LPU | Last Past Usage |
| MPTCP | Multipath TCP |
| OSI | Open System Interconnection |
| QUIC | Quick UDP Internet Connections |
| TCP | Transport Control Protocol |
| UDP | User Datagram Protocol |

In the following detailed description, reference is made to the accompanying drawings, which form part of the disclosure, and in which are shown, by way of illustration, exemplary aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

FIG. 1 shows an exemplary multipath communication system 100 with two paths of different type, in particular of different cost. On transmit side, a generator 101 is used to generate data traffic 102 for a scheduler 113 of a multipath scheduler device 110. The scheduler 113 schedules the data traffic 102 for transmission via a first type data path (1) 111 which is associated with a cheap pipe and transmission via a second type data path (2) 112 which is associated with an expensive data pipe. At receiver side, both data paths 111, 112 are combined for reception at a receiver 103.

FIG. 1 depicts a generic approach for multipath usage, where each of the above mentioned protocols, i.e. MPTCP, Multipath QUIC and Huawei's GRE Tunnel Bonding Protocol can be applied. FIG. 1 differentiates between two paths 111, 112, which have different costs (cheap, expensive). Cost does not inevitably mean a direct payment, it can also be defined in latency, reliability and many others. A single OSI Layer 3 or OSI Layer 4 connection can already profit from an increased capacity. An often used service over the internet is non-real-time video streaming. A common traffic pattern therefore, if the capacity on the path is not the bottleneck, is bursty with gaps in between. The video source tries to fill a buffer at the sink as fast as possible and stops if the buffer is full. As soon as the buffer is empty by some level, the source tries again to fill the sink buffer as fast as possible.

To solve or mitigate the above described technical problem, the disclosure presents a solution that is based on delaying the usage of an expensive path. Furthermore three different exemplary implementations are presented hereinafter.

The concept is not limited to two paths as shown in FIG. 1 for illustrative purposes, it can handle any number of paths as long as there is an information about path cost. Whenever the expensive path 112 is requested to transmit traffic, it tries to detect a bursty traffic pattern, e.g. by recognizing a peak behavior on the expensive path 112. If it assumes so, it delays the access to the expensive path 112. If a longer request to the expensive path 112 is observed, access is given, because a peak is not assumed anymore or the cheaper path 111 cannot fulfill capacity demand. This design may be directly related to the multipath scheduler 110 shown in FIG. 1, but can also be externally applied.

In the following, the multipath scheduler device 110 is described in more detail.

The multipath scheduler device 110 can be used for scheduling data traffic 102 for transmission via at least one first type data path, e.g. path 111 as shown in FIG. 1 and at least one second type data path, e.g. path 112 as shown in FIG. 1. The multipath scheduler device 110 comprises: at least one first type data path 111; at least one second type data path 112; and a scheduler 113. The scheduler 113 is configured to schedule the data traffic 102 for transmission via the at least one first type data path 111 and to schedule the data traffic 102 for delayed transmission via the at least one second type data path 112. In an exemplary implementation, the scheduler 113 may be configured to schedule the data traffic 102 for delayed transmission via the at least one second type data path 112 based on a capacity threshold 201 of the at least one first type data path 111, e.g. as shown in FIGS. 2 to 6 and/or based on a traffic distribution function. The capacity usage of the at least one first type data path 111 as threshold to overflow into the at least one second type data path 112 is of descriptive nature throughout this disclosure. Any kind of distributing function can be combined with delaying transmission via the at least one second type data path.

The data traffic 102 transmission via the at least one second type data path 112 is more expensive than data traffic 102 transmission via the at least one first type data path 111, in particular more expensive with respect to latency, reliability, capacity, complexity and/or cost.

The scheduler 113 may be configured to schedule the data traffic 102 for delayed transmission via the second type data path 112 if a bursty traffic pattern of the data traffic 102 is detected. The scheduler 113 may be configured to detect a bursty traffic pattern based on a peak behavior of data traffic 102 scheduled for transmission via the at least one second type data path 112.

The scheduler 113 may be configured to delay access to the at least one second type data path 112 based on a trigger. The trigger may be based on a traffic parameter or a combination of traffic parameters. The trigger may be based on a last path usage, $T_{LPU}$ 402, e.g. as described with respect to FIG. 4 and a corresponding path access delay, $T_{Delay}$ 403 (see FIG. 4). The scheduler 113 may be configured to delay access to the at least one second type data path 112 if the last path usage, $T_{LPU}$ 402 is higher than a threshold, e.g. as described below with respect to FIG. 4. The scheduler 113 may be configured to deny access to the at least one second type data path 112 for a time corresponding to the path access delay, $T_{Delay}$ 403, e.g. as described below with respect to FIG. 4. The trigger may be based on a data volume, a data volume in a predefined time period or a combination thereof.

The scheduler 113 may be configured to delay access to the at least one second type data path 112 based on an access limitation function 503, e.g. as described below with respect to FIG. 5. The access limitation function 503 may comprise a slope function 503, in particular an exponential function 503, e.g. as described below with respect to FIG. 5, a ramp function or a step function.

The scheduler 113 may be configured to buffer the data traffic 102b overflowing the capacity threshold 201 and to schedule the buffered data traffic 102b for transmission via the at least one first type data path 111, e.g. as described below with respect to FIGS. 6a, 6b and 6c. The at least one first type data path 111 may comprise a send buffer 601 configured to buffer the overflowing data traffic 102b, e.g. as described below with respect to FIGS. 6a, 6b, 6c. A size of the send buffer 601 may be adjustable based on the overflowing data traffic 102b. The capacity usage of the at least one first type data path 111 as threshold to overflow into the at least one second type data path 112 is of descriptive nature throughout this disclosure. Any kind of distributing function can be combined with delaying transmission via the at least one second type data path.

Figure 2:
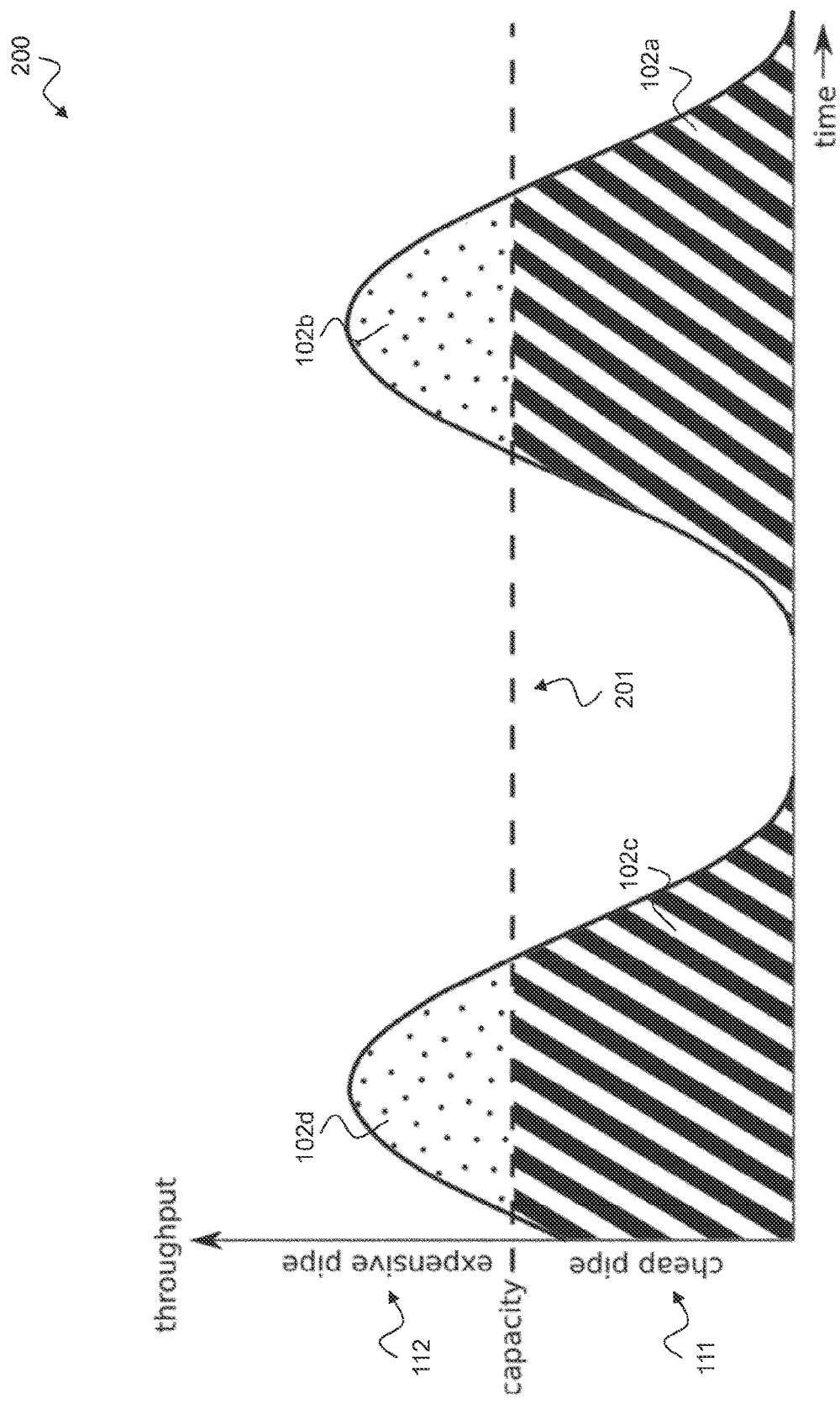
FIG. 2 shows a throughput diagram 200 illustrating an exemplary traffic pattern in a multipath scenario, which requires overflow from one to another path according to the disclosure.

FIG. 2 shows a throughput diagram 200 illustrating an exemplary traffic pattern in a multipath scenario, which requires overflow from one to another path according to the disclosure.

As described above with respect to FIG. 1, an often used service over the Internet is non-real-time video streaming. A common traffic pattern therefore, if the capacity on the path is not the bottleneck, is bursty with gaps in between. A similar traffic pattern is shown in FIG. 2. In case of a multipath scenario, where additional capacity is provided, bursty traffic is tempted to use this and combines eventually the capacity of a cheaper path 111 with the capacity of an expensive path 112.

In the example of FIG. 2, past time is on the right side of time axis while current time is shown in the origin of the diagram. The traffic is bursty with a first burst comprising basic traffic 102a and peak traffic 102b and a second burst comprising basic traffic 102c and peak traffic 102d. A capacity threshold 201 denotes the limit between basic traffic and peak traffic. The basic traffic 102a, 102 of each burst is filling the cheap pipe 111 while the peak traffic 102b, 102d of each burst is filling the expensive pipe 112.

Figure 3:
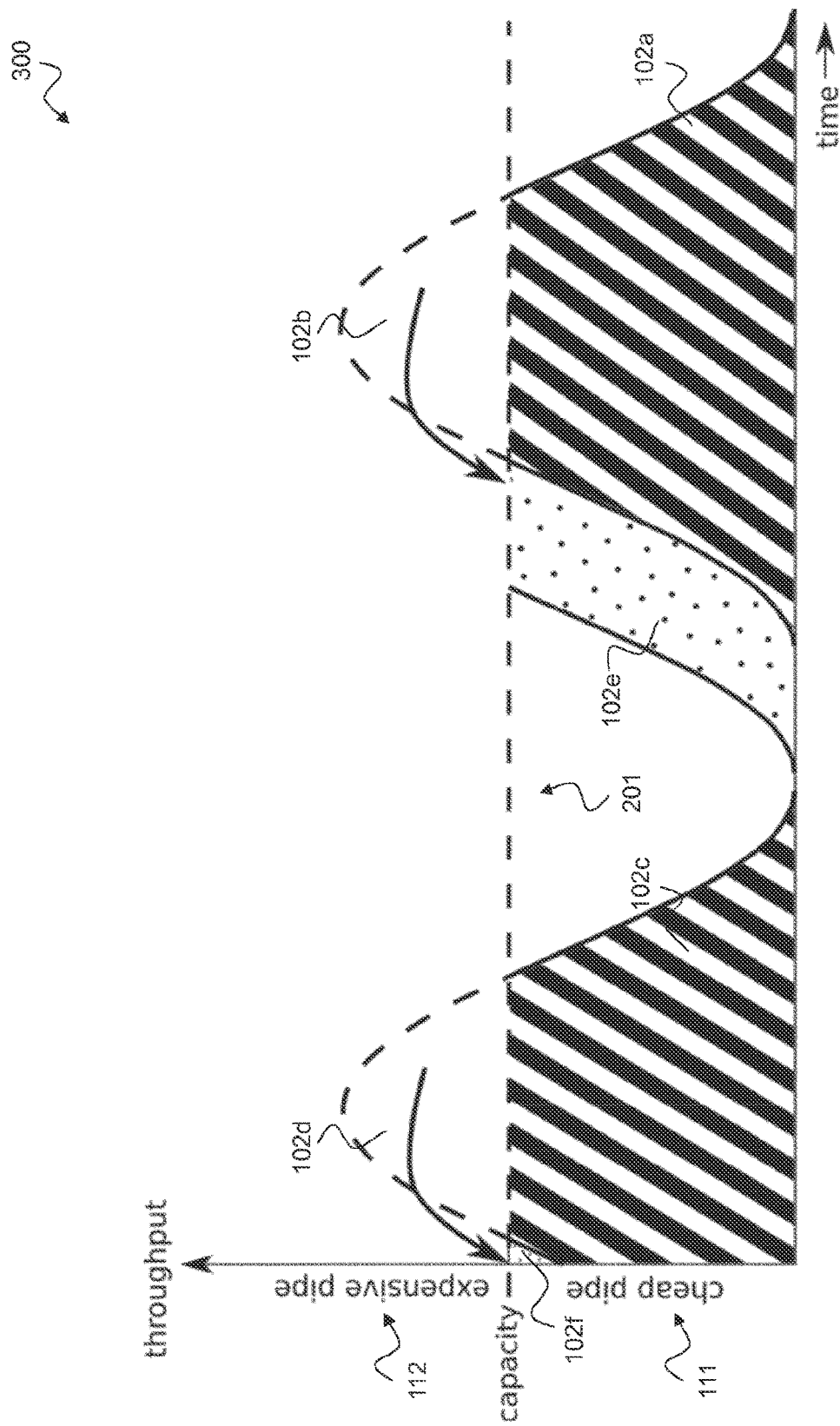
FIG. 3 shows a throughput diagram 300 illustrating an ideal shift 300 of overflowing traffic into the cheaper path according to the disclosure.

FIG. 3 shows a throughput diagram 300 illustrating an ideal shift 300 of overflowing traffic into the cheaper path according to the disclosure. In this diagram, past time is on the right side of time axis while current time is shown in the origin of the diagram. The traffic corresponds to the traffic shown in FIG. 2, it is bursty with a first burst comprising basic traffic 102a and peak traffic 102b and a second burst comprising basic traffic 102c and peak traffic 102d. The peak traffic 102b, 102d is shifted from the expensive pipe 112 to the cheap pipe 111. The shifted data traffic is denoted by reference signs 102e and 102f. The capacity threshold 201 denotes the limit between basic traffic and peak traffic.

In this example, the capacity of the cheaper path 111 is sufficient and the overflow 102b, 102d fits into the gaps between the bursts as shown in FIG. 3. In principle bursty traffic patterns are not limited to non-real-time video streaming services, it is just an example.

The trigger for delaying access to an expensive path 112 can be determined by different parameters or a combination of parameters. In the following some examples are presented, but they do not comprise every possibility for setting and getting a trigger point and how to delay the access to an expensive path.

Figure 4:
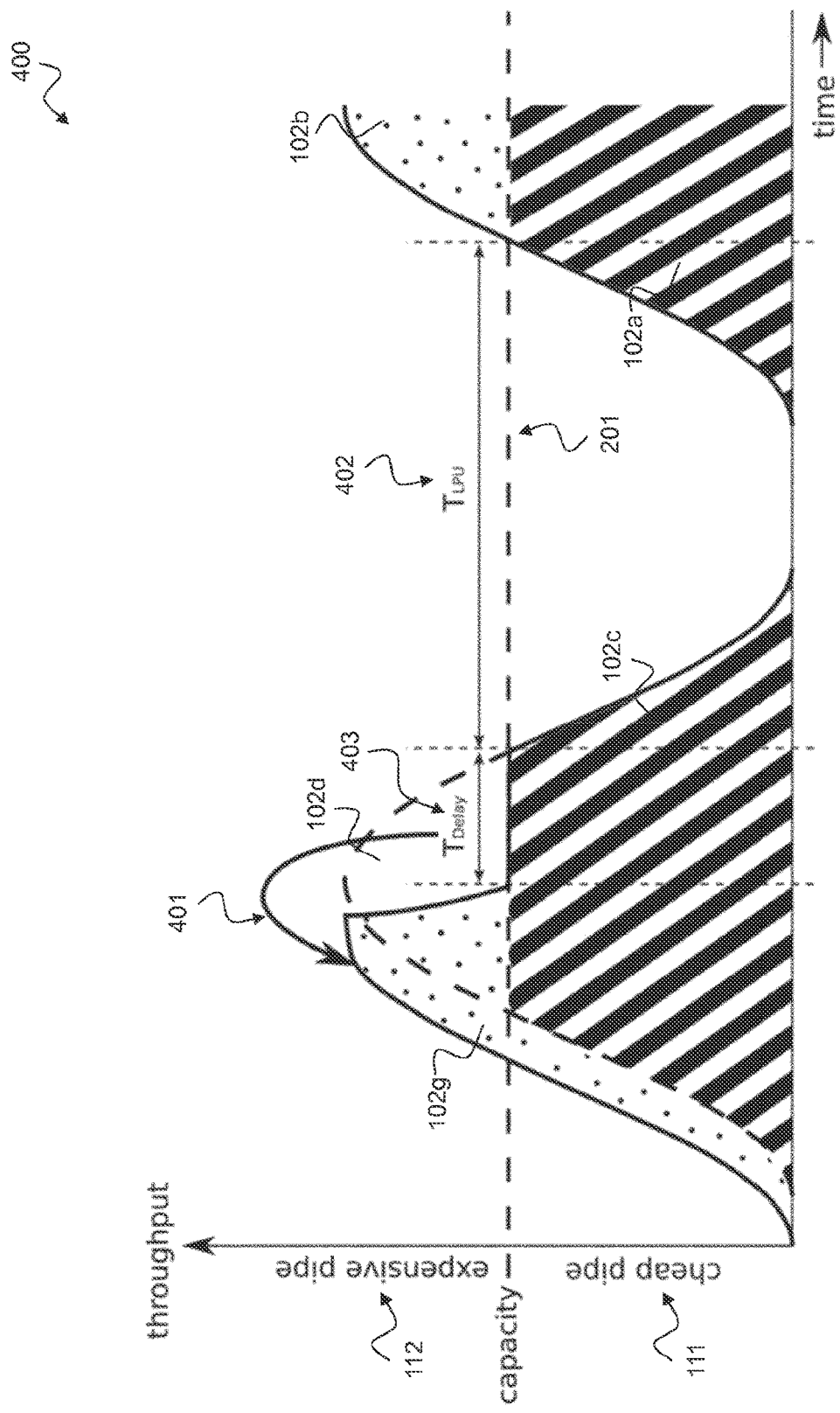
FIG. 4 shows a throughput diagram 400 illustrating a peak detection and path usage delay on expensive path according to the disclosure.

FIG. 4 shows a throughput diagram 400 illustrating a peak detection and path usage delay on expensive path according to the disclosure. In this diagram, past time is again on the right side of time axis while current time is shown in the origin of the diagram. The traffic corresponds to the traffic shown in FIGS. 2 and 3, it is bursty with a first burst comprising basic traffic 102a and peak traffic 102b and a second burst comprising basic traffic 102c and peak traffic 102d. The peak traffic 102d is at least partially shifted 401 with a delay time, $T_{Delay}$ 403 from the expensive pipe 112 to the cheap pipe 111. The at least partially shifted data traffic is denoted by reference sign 102g. The capacity threshold 201 denotes the limit between basic traffic and peak traffic.

In the implementation shown in FIG. 4, two parameters are specified, the last path usage ($T_{LPU}$) 402 and the corresponding path access delay ($T_{Delay}$) 403. Based on the last usage of an expensive path 112, compared to a current path request a bursty traffic pattern is ensured. If $T_{LPU}$ is higher than a defined threshold, access to the path is denied by a time $T_{Delay}$. This will give the cheaper path 111 the possibility, if capacity is available, to transmit a greater part of the overall request. $T_{LPU}$ is not mandatory and can be replaced by any other trigger mechanism. For example it can use the information about data volume or data volume in a defined time period or a combination. Furthermore, it can use the information about gaps on the cheaper path 111 traffic transmission or in general heuristic methods.

Figure 5:
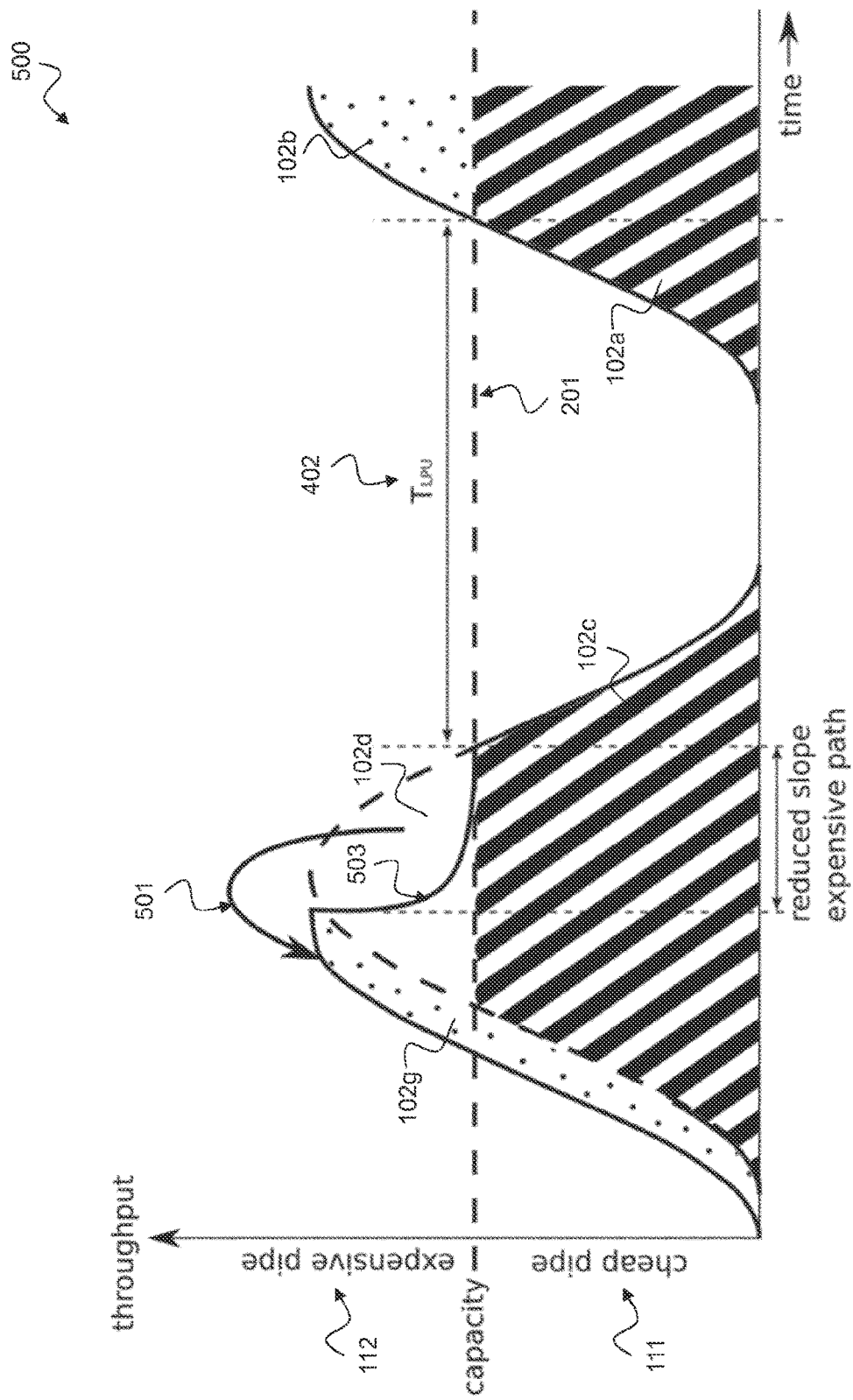
FIG. 5 shows a throughput diagram 500 illustrating a peak detection and stretched slope behavior of expensive path according to the disclosure.

FIG. 5 shows a throughput diagram 500 illustrating a peak detection and stretched slope behavior of an expensive path according to the disclosure. The mechanism shown in FIG. 5 is similar to that shown in FIG. 4, but does not define a $T_{Delay}$, rather replace it with a slow removing access limitation 503, e.g. an exponential function or a ramp function or an on/off function. $T_{LPU}$ 402 again can be used as trigger point for that limitation. This scenario can also be implemented by applying a special congestion control algorithm with a reduced slope. In an exemplary implementation, a parameter can be defined to limit the stretched slope function in time, similar to $T_{Delay}$ 403.

Figure 6A:
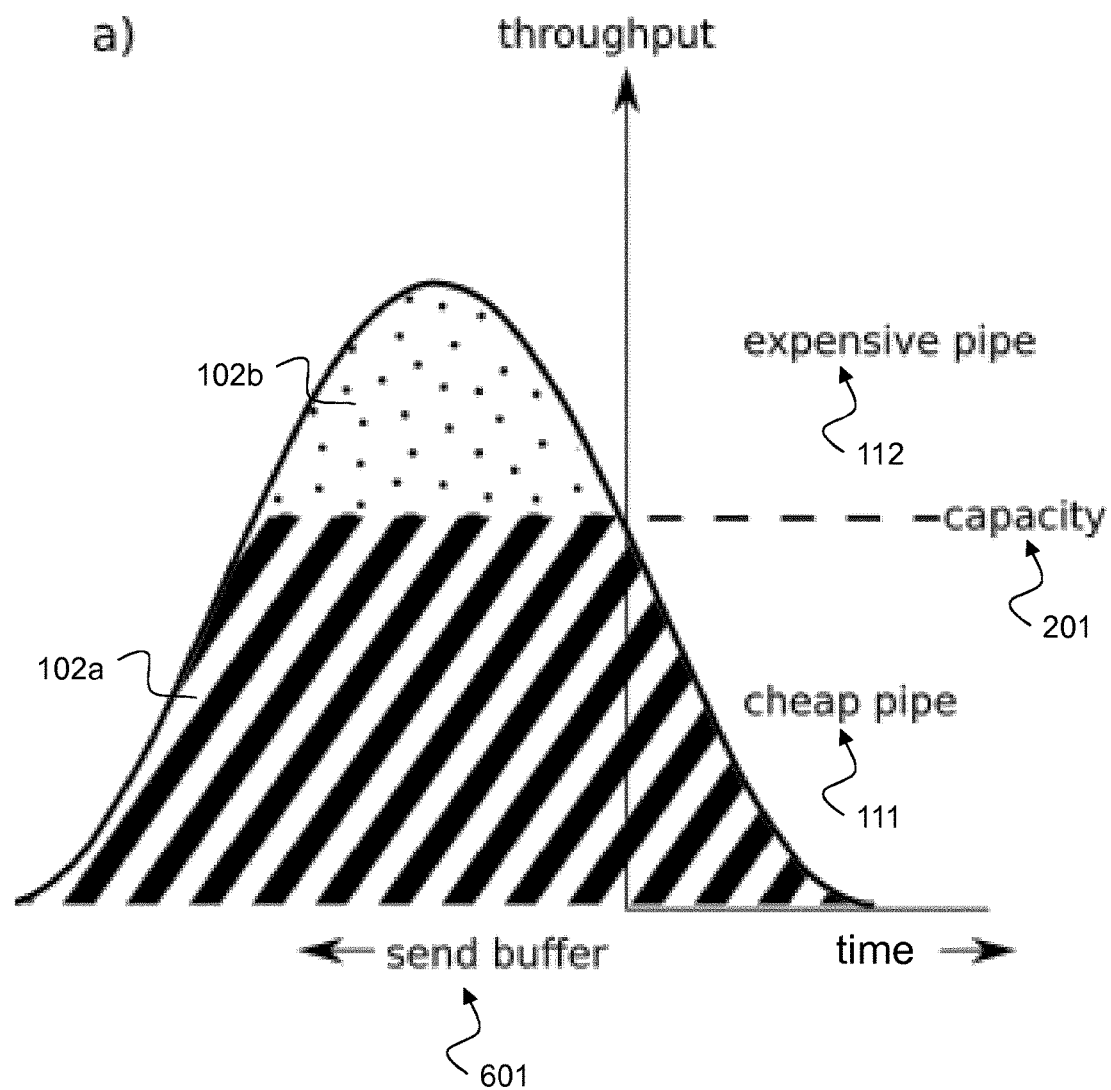
FIGS. 6a, 6b and 6c show throughputs diagram 600a, 600b, 600c illustrating burst buffer on cheaper path to take overflowing traffic to some extent according to the disclosure.
Figure 6B:
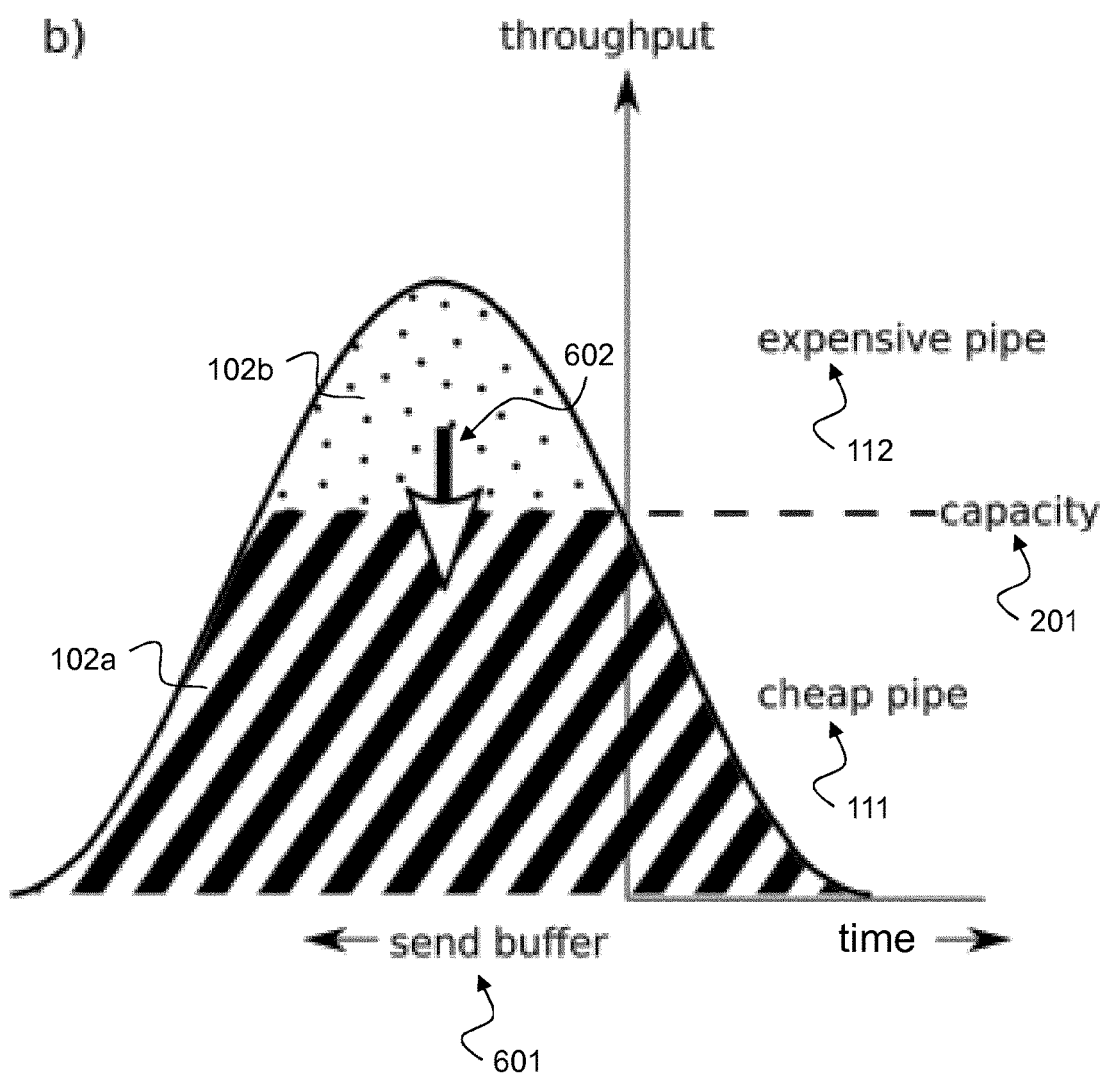
Figure 6C:
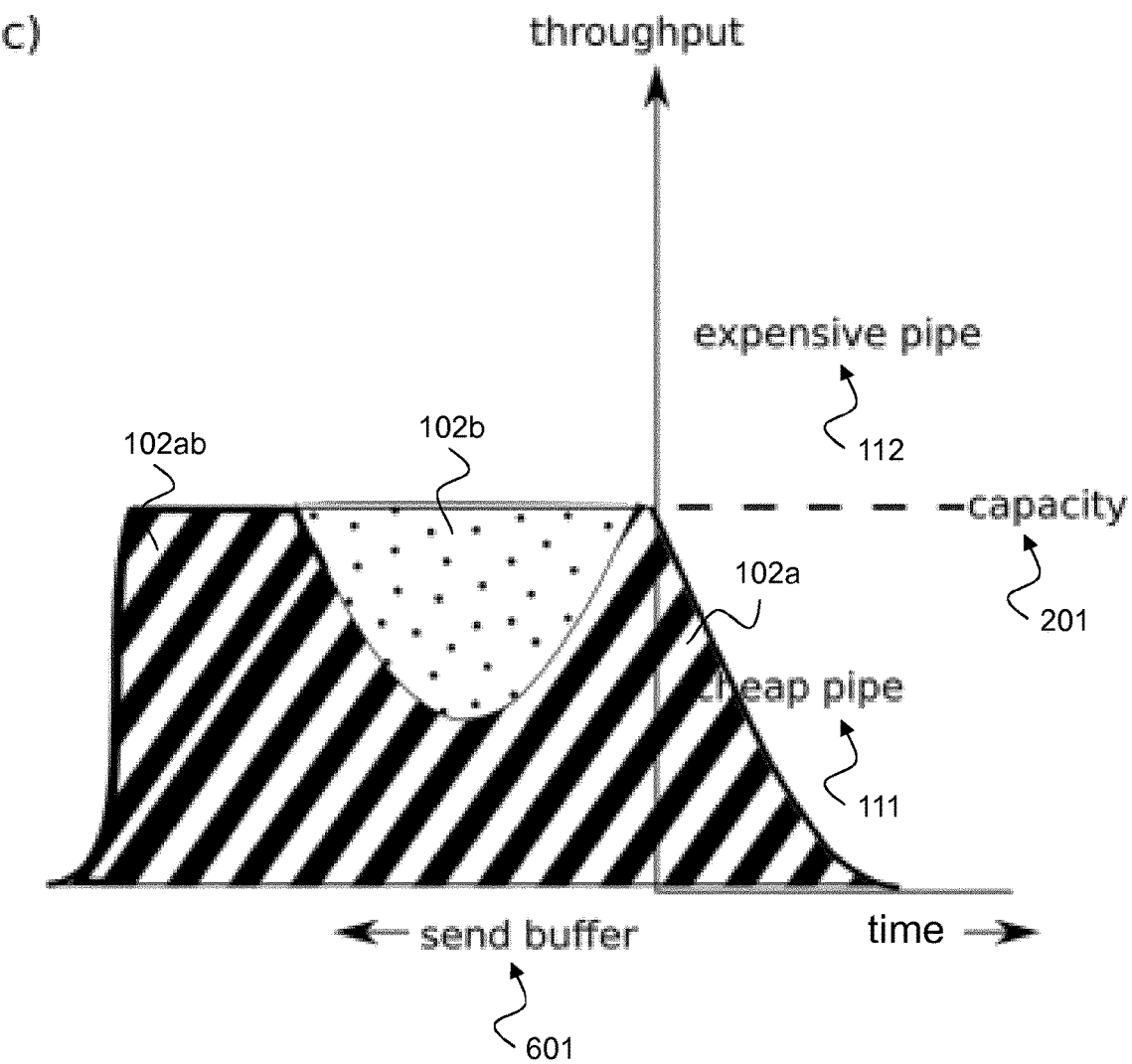

FIGS. 6a, 6b and 6c show throughputs diagram 600a, 600b, 600c illustrating burst buffer on cheaper path to take overflowing traffic to some extent according to the disclosure. In these diagrams, past time is again on the right side of time axis while current time is shown in the origin of the diagram. The traffic corresponds to the traffic shown in FIGS. 2 to 5, it is bursty with a first burst shown which comprises basic traffic 102a and peak traffic 102b.

With respect to FIGS. 6a, b, c, another concept is applied, which focuses on buffering, before scheduling is applied, the overflowing traffic 102b and transmitting it via the cheaper path 111. FIG. 6a shows a high traffic demand (burst), which would overflow into the expensive path 112. The idea shown in FIG. 6b is to press/shift 602 the overflow part 102b into the cheap path 111 send buffer 601 and if necessary, to increase the send buffer 601 for buffering the overflow part 102b. Another commonly used word for such a buffer 601 is burst buffer. It can be a network protocol inherent buffer, a device buffer, an interface buffer or any other buffer, which can be used therefore as long as the buffer is arranged before the bottleneck of the cheap path 111 as shown in FIG. 6c. This results in a higher fill level of the send buffer, 601 because it represses already scheduled traffic on that path 111. The size, respectively the size extension for offloading of the send buffer 601 is similar to the impact of $T_{Delay}$ shown in FIGS. 4 and 5. Shifting the overflow traffic 102b into the send buffer, however, has the risk of a higher end-to-end delay.

Figure 7:
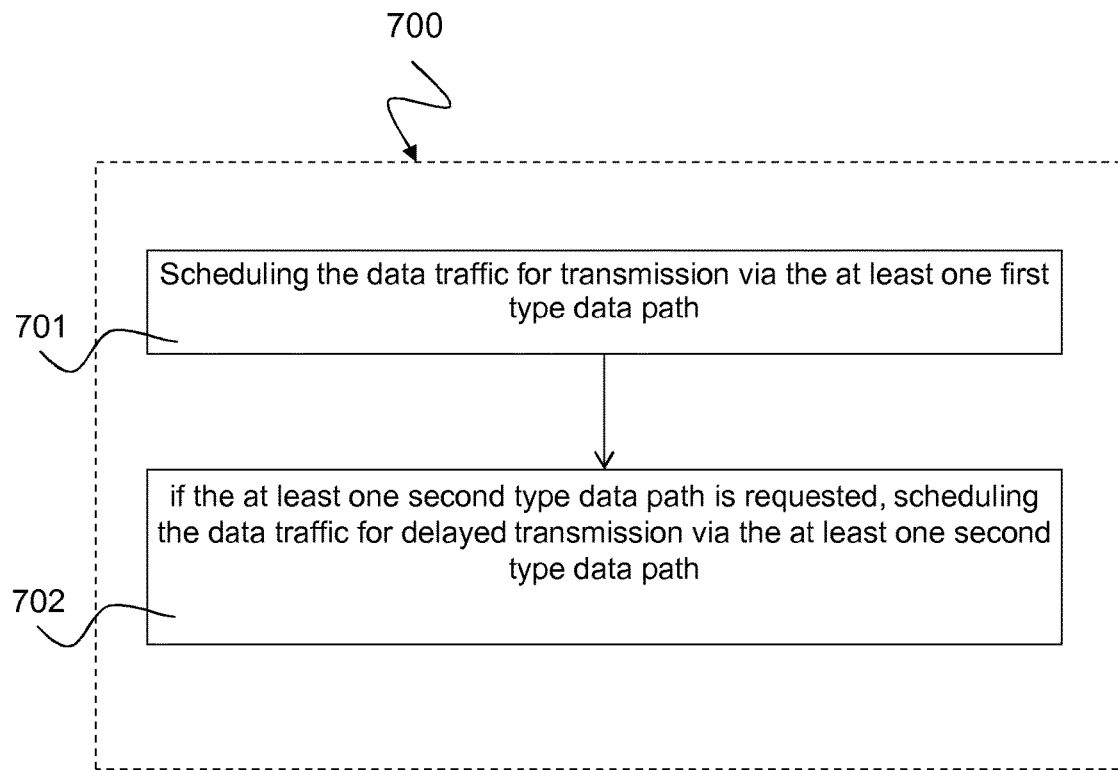
FIG. 7 shows a schematic diagram illustrating a method 700 for scheduling multipath data traffic for transmission via at least one first type data path and at least one second type data path according to the disclosure.

FIG. 7 shows a schematic diagram illustrating a method 700 for scheduling multipath data traffic for transmission via at least one first type data path and at least one second type data path according to the disclosure. The data traffic may correspond to the data traffic 102, 102a, 102b, 102c, 102d, 102e, 102f, 102g as shown with respect to FIGS. 1 to 6.

The method 700 comprises scheduling 701 the data traffic 102 for transmission via the at least one first type data path 111, e.g. a first type or cheap data path 111 as described above with respect to FIGS. 1 to 6. The method 700 further comprises: if the at least second type data path 112 is requested, scheduling 702 the data traffic 102 for delayed transmission via the at least one second type data path 112, e.g. as described above with respect to FIGS. 1 to 6.

The method 700 may be implemented on a multipath scheduler device 110 as described above with respect to FIGS. 1 to 6.

The method 700 may include further steps, such as, for example, according to the computing blocks described above with reference to FIG. 1 or the mechanisms as described above with respect to FIGS. 2 to 6.

The method 700 may be implemented on a computer. Another aspect of the invention relates to a computer readable non-transitory medium on which computer instructions are stored which, when executed by a computer, cause the computer to perform the method 700.

Another aspect of the invention is related to a computer program product comprising program code for performing the method 700 or the functionalities described above, when executed on a computer or a processor. The method 700 may be implemented as program code that may be stored on a non-transitory computer medium. The computer program product may implement the techniques described above with respect to FIGS. 1 to 6.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for scheduling data traffic for transmission, the system comprising:
    at least one first type data path;
    at least one second type data path; and
    a multipath scheduler device configured to:
        detect that the data traffic has a bursty traffic pattern, wherein the bursty traffic pattern comprises bursts of data traffic and gaps between the bursts of data traffic; and
        based on detecting that the data traffic has a bursty traffic pattern:
            schedule part of the data traffic for transmission via the at least one first type data path and schedule part of the data traffic for delayed transmission via the at least one second type data path, wherein the part of the data traffic scheduled for delayed transmission via the at least one second type data path is at least a first part of the data traffic overflowing a capacity threshold of the at least one first type data path;
            delay access to the at least one second type data path based on a trigger or an access limitation function; and
            buffer and schedule for transmission at a later time via the at least one first type data path at least a second part of the data traffic overflowing the capacity threshold of the at least one first type data path;
        wherein scheduling at least the second part of the data traffic overflowing the capacity threshold for transmission at a later time comprises scheduling at least the second part of the data traffic overflowing the capacity threshold for transmission during the gaps between the bursts of the bursty data traffic.

2. The system of claim 1, wherein the multipath scheduler device is configured to schedule the part of the data traffic for delayed transmission via the at least one second type data path based on a traffic distribution function for distributing the data traffic between the at least one first type data path and the at least one second type data path.

3. The system of claim 1, wherein data traffic transmission via the at least one second type data path is more expensive than data traffic transmission via the at least one first type data path with respect to latency, reliability, capacity, complexity and/or cost.

4. The system of claim 1, wherein the multipath scheduler device is configured to detect that the data traffic has a bursty traffic pattern based on a peak behavior of data traffic scheduled for transmission via the at least one second type data path.

5. The system of claim 4, wherein the trigger is based on a traffic parameter or a combination of traffic parameters.

6. The system of claim 4, wherein the trigger is based on a last path usage ($T_{LPU}$) and a corresponding path access delay ($T_{Delay}$).

7. The system of claim 6, wherein the multipath scheduler device is configured to delay access to the at least one second type data path based on the last path usage ($T_{LPU}$) being higher than a threshold.

8. The system of claim 7, wherein the multipath scheduler device is configured to deny access to the at least one second type data path for a time corresponding to the path access delay ($T_{Delay}$).

9. The system of claim 4, wherein the trigger is based on a data volume, a data volume in a predefined time period or a combination thereof; and/or
    wherein the trigger is based on information about gaps in traffic transmission of the at least one first type data path; and/or
    wherein the trigger is based on heuristic methods.

10. The system of claim 1, wherein the access limitation function comprises an exponential function, a ramp function, or a step function.

11. The system of claim 1, wherein the at least one first type data path comprises a send buffer configured to buffer the overflowing data traffic, wherein a size of the send buffer is adjustable based on the overflowing data traffic.

12. A method for scheduling multipath data traffic for transmission via at least one first type data path and at least one second type data path, the method comprising:

detecting, by a multipath scheduler device, that the data traffic has a bursty traffic pattern, wherein the bursty traffic pattern comprises bursts of data traffic and gaps between the bursts of data traffic; and based on detecting that the data traffic has a bursty traffic pattern:

scheduling, by the multipath scheduler device, a part of the data traffic for transmission via the at least one first type data path and part of the data traffic for delayed transmission via the at least one second type data path, wherein the part of the data traffic scheduled for delayed transmission via the at least one second type data path is at least a first part of the data traffic overflowing a capacity threshold of the at least one first type data path;

delaying, by the multipath scheduler device, access to the at least one second type data path based on a trigger or an access limitation function; and buffering and scheduling, by the multipath scheduler device, for transmission at a later time via the at least one first type data path at least a second part of the data traffic overflowing the capacity threshold of the at least one first type data path;

wherein scheduling at least the second part of the data traffic overflowing the capacity threshold for transmission at a later time comprises scheduling at least the second part of the data traffic overflowing the capacity threshold for transmission during the gaps between the bursts of the bursty data traffic.

13. A system for scheduling data traffic for transmission, the system comprising:

at least one first type data path;
at least one second type data path; and
a multipath scheduler device configured to:

detect that the data traffic has a bursty traffic pattern, wherein the bursty traffic pattern comprises bursts of data traffic and gaps between the bursts of data traffic; and based on detecting that the data traffic has a bursty traffic pattern:

schedule part of the data traffic for transmission via the at least one first type data path and schedule part of the data traffic for delayed transmission via the at least one second type data path, wherein the part of the data traffic scheduled for delayed transmission via the at least one second type data path is at least a first part of the data traffic overflowing a capacity threshold of the at least one first type data path;

delay access to the at least one second type data path based on a trigger or an access limitation function; and buffer and schedule for transmission at a later time via the at least one first type data path at least a second part of the data traffic overflowing the capacity threshold of the at least one first type data path;

wherein the multipath scheduler device is configured to detect that the data traffic has a bursty traffic pattern based on a peak behavior of data traffic scheduled for transmission via the at least one second type data path.

* * * * *